United States Patent
Bishop

[15] 3,648,790
[45] Mar. 14, 1972

[54] WEIGHING APPARATUS
[72] Inventor: Brian L. H. Bishop, Witney, England
[73] Assignee: Smiths Industries Limited, London, England
[22] Filed: July 15, 1970
[21] Appl. No.: 54,939

[30] Foreign Application Priority Data
July 18, 1969  Great Britain......................36,212/69

[52] U.S. Cl............................177/137, 177/184, 177/210
[51] Int. Cl.....................................................G01g 19/08
[58] Field of Search..................177/136, 137, 138, 210, 184, 177/187

[56] References Cited

UNITED STATES PATENTS

| | | | |
|---|---|---|---|
| 3,092,818 | 6/1963 | Potschka | 177/137 X |
| 3,109,505 | 11/1963 | Davis et al. | 177/137 |
| 3,142,349 | 7/1964 | Blodgett | 177/210 X |
| 3,151,692 | 10/1964 | Dysart | 177/138 |
| 3,167,142 | 1/1965 | Meneely | 177/137 |
| 3,314,491 | 4/1967 | Nelson | 177/138 |

Primary Examiner—Richard B. Wilkinson
Assistant Examiner—George H. Miller, Jr.
Attorney—William D. Hall, Elliott I. Pollock, Fred C. Philpitt, George Vande Sande, Charles F. Steininger and Robert R. Priddy

[57] ABSTRACT

Weighing apparatus incorporated in a vehicle to be responsive to the load on the vehicle axle(s) and to be used when the vehicle is in motion. Mechanical low-pass filtering means are provided to attenuate sudden variations of the relative displacement between the vehicle's load carrying structure and axle(s) at least when the moving vehicle is heavily loaded so that only the average value of this varying relative displacement is utilized in giving an indication of the load carried by said structure.

18 Claims, 6 Drawing Figures

Brian L. M. Bishop
Inventor by Hall, Pollock of Vande Sande

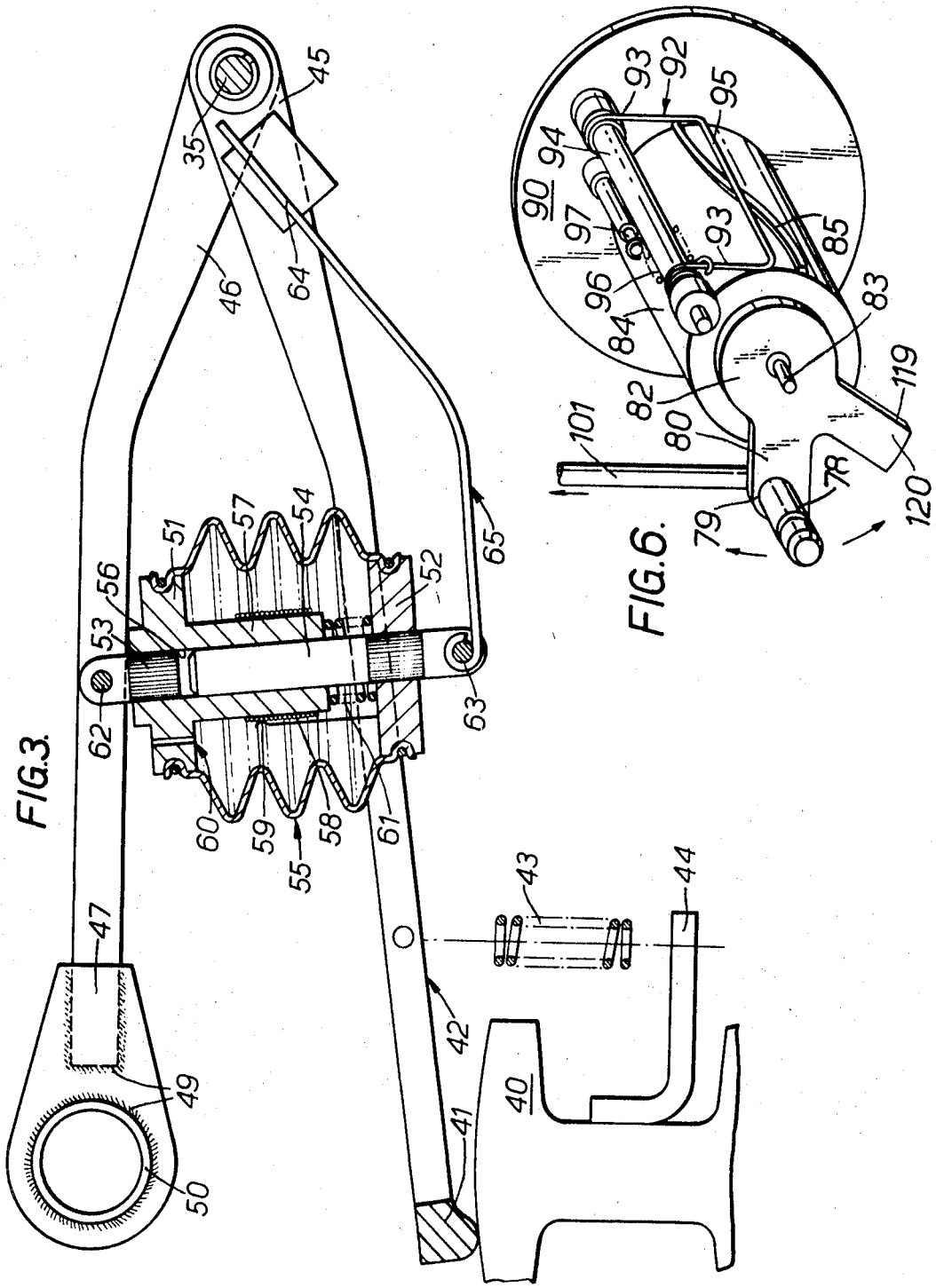

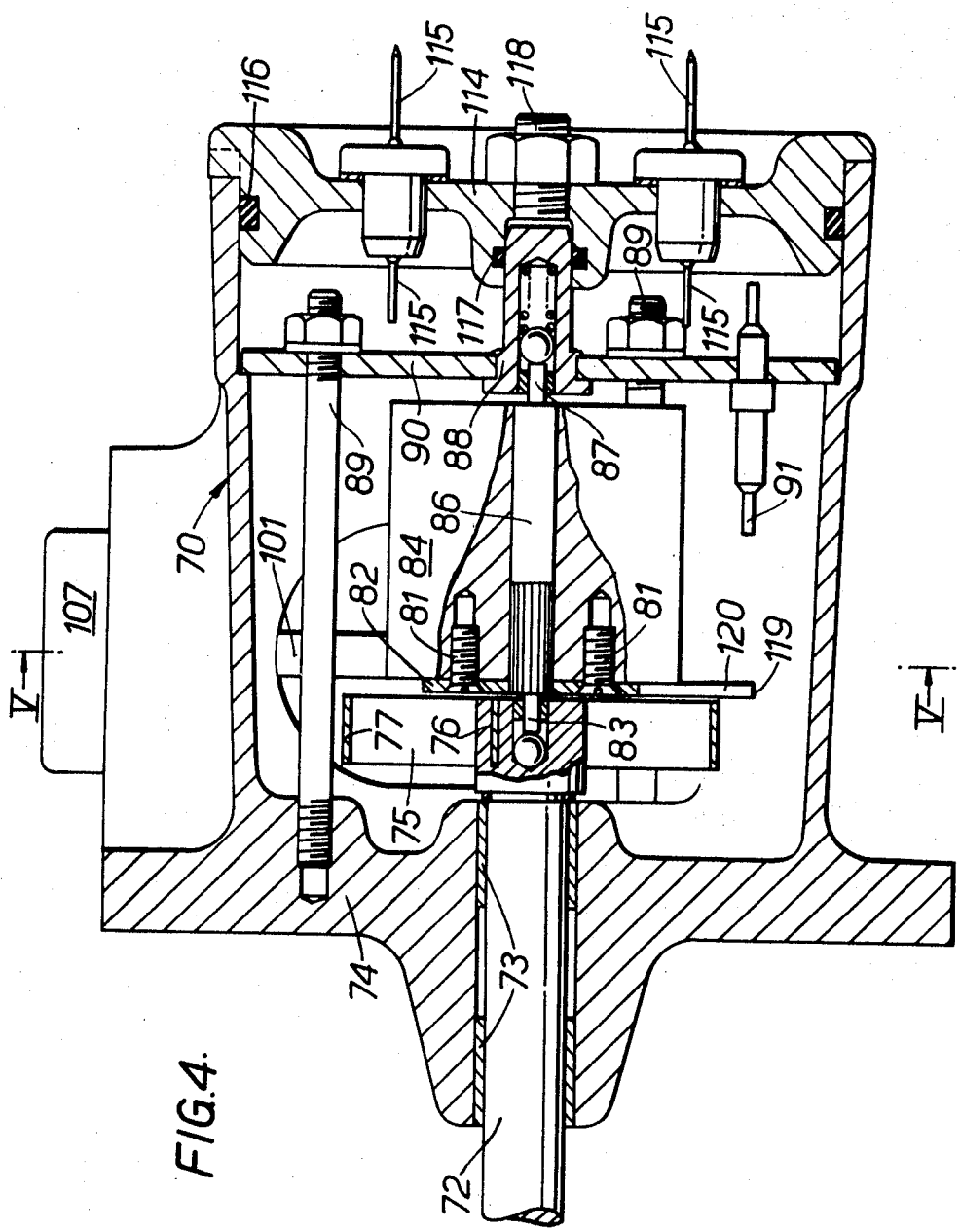

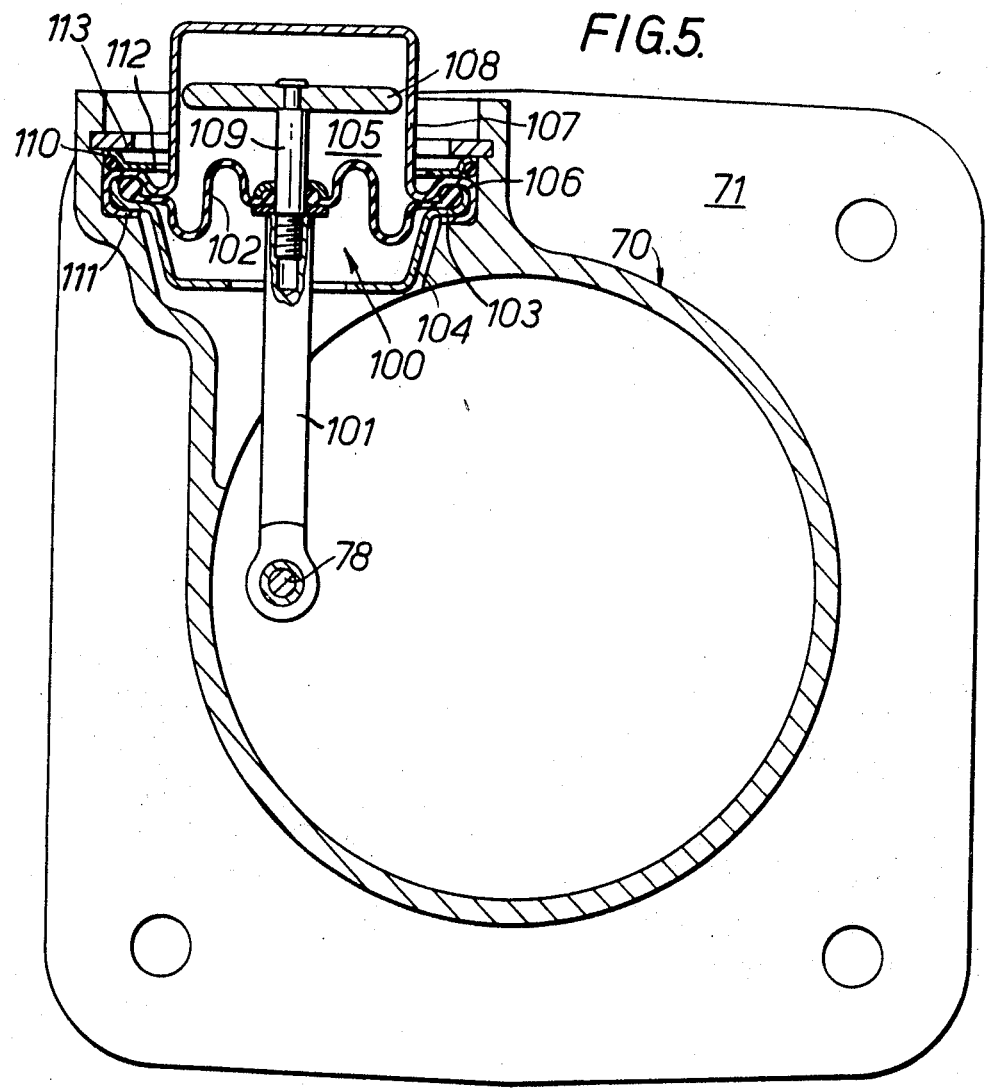

WEIGHING APPARATUS

This invention relates to weighing apparatus and in particular to weighing apparatus of the kind adapted or intended to be incorporated in a vehicle so as to be responsive to variations in the load carried by the vehicle.

One type of apparatus of this kind, comprises an electrical indicator (preferably having a pointer cooperating with a scale) and a sensor comprising two relatively movable elements (for example a contact element arranged for wiping engagement of an electrical resistance element to vary the effective electrical resistance of the latter) whose relative movement (hereinafter referred to as the induced relative movement) produces a varying electric signal and is directly related to the relative movement between the load-carrying structure of the vehicle and the road. Generally speaking the relative movement between the load-carrying structure and the road is equivalent to changes in the position of the load-carrying structure relative to the road wheels and/or to the axles of the vehicle, the axles supporting the load-carrying structure through springs whose vertical deflections are related to the total vertical forces acting on the springs.

Prior proposals for this type of apparatus have apparently assumed that the vertical deflections of the springs are at all times directly related to the total load, i.e., to the weight of the load-carrying structure plus the load (if any) carried thereby. The applicants herein have now realized that, at least as concerns certain forms of spring, in particular leaf-springs, this fundamental assumption does not take into consideration the temporary indeterminancy of the settling-position of the springs when the vehicle is stationary, which indeterminancy is believed attributable to the indeterminate variations in striction or friction, in particular between the leaves of leaf springs, and that therefore the indications of load given by the indicators of these prior proposals would be indeterminate and usually inaccurate when obtained with the vehicle stationary.

It will be readily apparent that a single indicator can be used for a plurality of sensors that are each responsive to a proportion of the total vertical forces (hereinafter referred to as the "proportional forces") acting on the springs, the average value of these proportional forces, which are not constant when the vehicle is in motion, being directly related to the proportion of the total load (hereinafter referred to as the "proportional load") producing them. Therefore as used hereinafter, the term "primary relative movement" is intended to mean the effective proportion of the relative movement between the load-carrying structure and the road that produces the induced relative movement between the two elements of a particular sensor.

According to one aspect of this invention there is provided a sensor for apparatus of the said one type that is intended to be utilized when the vehicle is in motion, which sensor has associated therewith mechanical low-pass filtering means to attenuate sudden variations of the primary relative movement which would otherwise produce sudden variations of the induced relative movement. In use, sudden variations of the primary relative movement could be caused by vehicle motion over a non-smooth terrain, for example a rough or pot-holed road.

Preferably the mechanical low-pass filtering means comprises spring means to transmit the primary relative movement or a fixed proportion thereof to an intermediate member at least when the proportional forces exceed a predetermined value; and mechanical damping means, actuable by movement of said intermediate member or a part rigidly connected thereto and comprising two relatively movable components to be disposed such that, in use, the induced relative movement is substantially proportional to the relative movement between said two components.

Preferably one of said components is rigidly connected to one of said elements for movement therewith; and the other of said components is rigidly connected to the other of said elements.

The mechanical damping means may comprise a variable volume chamber. In one arrangement the variable volume chamber is a flexible bellows having rigid end closure walls one of which is provided with a bleed aperture. One or other of said end closure walls may constitute said intermediate member or a part rigidly connected thereto. Preferably at least part of one of said elements is disposed within said flexible bellows; preferably both said elements are wholly disposed within said flexible bellows. In another arrangement the variable volume chamber comprises a cylinder closed at one end by a flexible diaphragm and containing a fluid acted upon by a member constituting one of said components.

Preferably said spring means reacts against and/or between said intermediate member or a part movable therewith and an abutment member intended in use to be abutted by a part of or rigidly connected to the vehicle axle or the load-carrying structure only when the proportional forces exceed said predetermined value. Restraining means may be provided to restrain said abutment member from abutting the part of or rigidly connected to the vehicle axle or the load-carrying structure when the proportional forces are below said predetermined value.

By arranging the spring means to transmit the primary relative movement only when the proportional forces exceed a predetermined value, the sensor is only continuously operative when the proportional load is above a predetermined value (corresponding to a predetermined value of the average of the proportional forces), and therefore, if the two elements of the sensor are always in engagement with one another, the risk of excessive wear of the elements is reduced. Furthermore, if the predetermined values of the proportional load and of the average of the proportional forces are each near the upper desired limit which that proportion may safely reach, the electrical indicator of the apparatus of which the sensor forms a part may be calibrated so that the pointer moves over substantially the whole scale as the proportional load varies between its predetermined value and its upper limit.

One form of two-element sensor is of an inductive character comprising a rotary or a linear differential transformer. The transformer may comprise an "E-transformer" having two oppositely would coils each on an extreme limb of the "E" (constituting one element) and a magnetizable bar (constituting the other element) disposed between the magnetic poles at the limb ends for movement relative to the limbs. Alternatively the transformer may comprise a ferrite rod relatively axially movable within a cylindrical coil former that has a central primary winding thereupon to be fed with a constant amplitude alternating voltage and has two symmetrically wound secondary windings thereupon disposed one each side of the primary winding and electrically connected in opposition.

However a preferred form of two-element sensor is of the rheostat type in which a contact element is arranged for relative wiping engagement of an electrical resistance element. Preferably the electrical resistance element is coiled about a generally cylindrical former. In a convenient arrangement in which the induced relative movement is angular, the former is provided externally with a rib or bead that follows a helical path about the longitudinal axis of said former and has a small helix angle, preferably of the order of 20°, so that small changes in said former's angular position can result in comparatively substantial changes in the effective resistance of the electrical resistance element.

According to another aspect of this invention there is provided apparatus of the said one type that is intended to be utilized when the vehicle is in motion, comprising a sensor according to said one aspect of the invention and an electrical indicator, which preferably comprises a moving-coil type of movement.

By way of example, embodiments of this invention will now be described with reference to the accompanying drawings of which:

FIG. 3 is a similar view to that of FIG. 1 of a second embodiment;

FIG. 4 is a longitudinal cross-sectional view of a third embodiment;

FIG. 5 is a cross-sectional view taken along the line V—V of FIG. 4; and

FIG. 6 is a schematic perspective view of part of said third embodiment.

Figure 1:
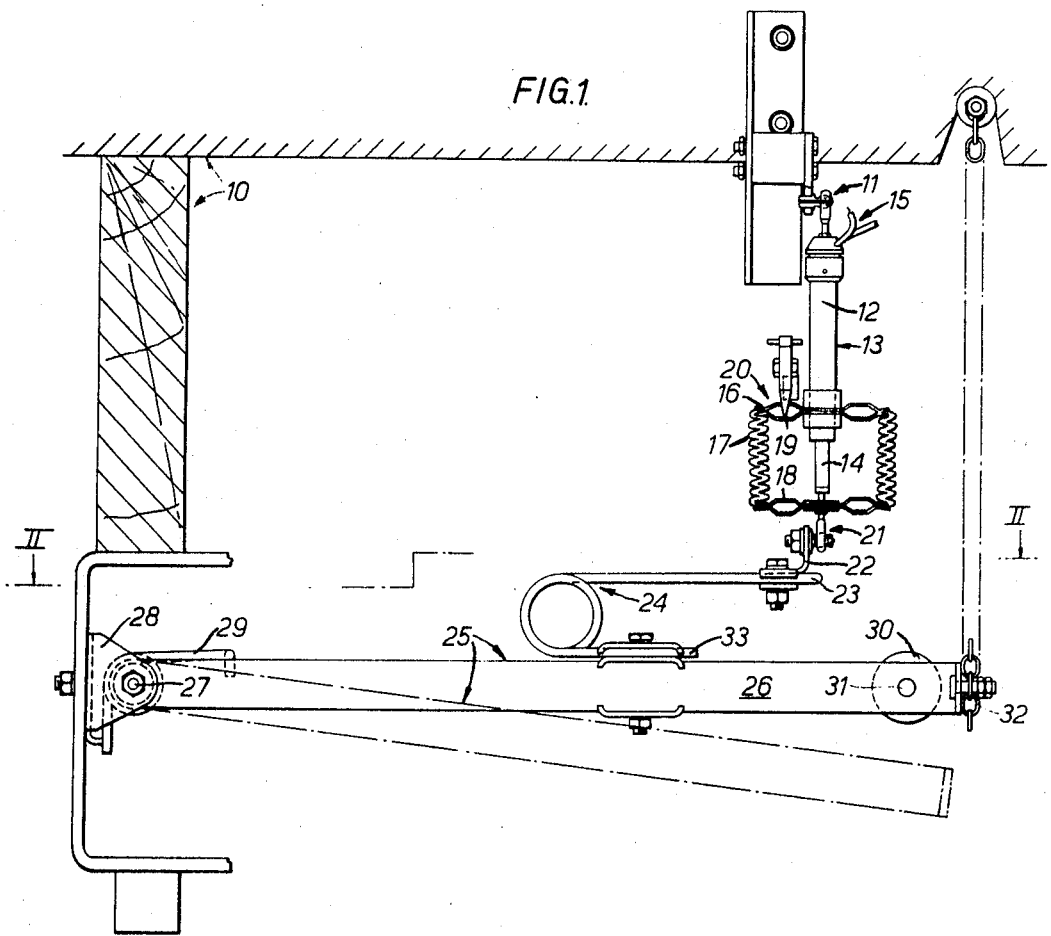
FIG. 1 shows schematically a first embodiment mounted beneath a load-carrying structure of a vehicle when viewed along the vehicle's longitudinal axis.
Figure 2:
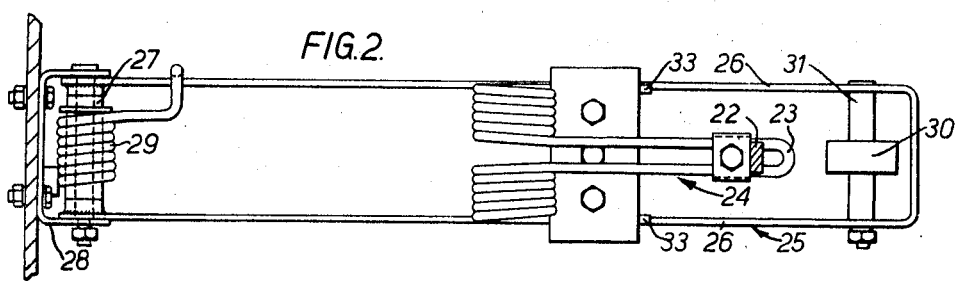
FIG. 2 is a cross-sectional view taken along the line II—II of FIG. 1.

Referring firstly to FIGS. 1 and 2, the vehicle's load-carrying structure 10 is supported at the rear of the vehicle on the vehicle's rear axle(s) through leaf springs disposed longitudinally of the vehicle at the ends of the or each rear axle. The load-carrying structure 10 has secured thereto (via a ball-and-socket connection 11) the upper end of the outer tubular casing 12 of a rheostat unit 13 that comprises a coiled resistance element and a contact element for wiping engagement of the coiled resistance element. One of the elements is fast with or constituted by a spindle 14 movable longitudinally within the casing 12 to thereby vary the effective electrical resistance of the rheostat unit when connected in an electrical circuit by the leads 15. The lower end of tubular casing 12 is secured to the rigid, double-skinned upper end closure wall 16 of a flexible bellows 17 whose rigid, double-skinned, lower end closure wall 18 is secured to the spindle 14 (which latter is thereby partially enclosed by the bellows 17). An air bleed aperture 19 is provided in wall 16 and if desired a variable constricting device 20 may be provided for the air bleed aperture 19. The upper and lower end closure walls 16 and 18 of the bellows 17 form its two relatively movable components, the former being vertically immovable with respect to the load-carrying structure 10.

The lower end closure wall 18 is secured to one end of a ball-and-socket connection 21 whose other end is secured to one limb of an L-shaped bracket 22. The other limb of bracket 22 is clamped to the central portion 23 of a generally U-shaped high rate spring 24 whose legs are oppositely coiled and clamped at their ends 33 to a beam 25. The beam 25 comprises an elongated U-shaped frame whose legs 26 are secured at one end to a pin 27 that is pivotally mounted in a bracket 28 rigidly secured to the load-carrying structure 10. A spring 29 coiled about the pivot pin 27 serves to urge the beam 25 downwardly. Adjacent the other end of the legs 26 there is provided a small wheel 30 pivotally mounted between the legs on a pivot pin 31 and disposed directly above a central portion of one rear axle of the vehicle (not shown) yet vertically spaced therefrom. A chain 32 (omitted from FIG. 2) whose ends are secured to the load-carrying structure 10 and the non-pivotted end of beam 25 serves to restrain the beam 25 from pivotting about pivot pin 27 to a position further clockwise than that shown in broken lines. Alternatively a flexible cable wire may replace chain 32.

In use, when the proportion of the total load affecting said one rear axle is increased, the proportional forces thereby induced cause the rear leaf-springs to be depressed so that the load-carrying structure moves nearer said one rear axle and the road. Transmission of this primary relative movement to the rheostat unit 13 is only commenced when the vertical separation between the rear axle's central portion and the wheel 30 is taken up. Thus an indication of the proportional load will only be obtained from the electrical indicator (connected via the circuit to lead 15) when the load is above some predetermined value, preferably near the maximum desired safety limit for this load. It will be appreciated that readings are taken of the electrical indicator while the vehicle is in motion so that, as explained above, the transmitted primary relative movement (equivalent to the vertical depression of the leaf-springs), that produces the induced relative movement between the two elements of the rheostat unit (which induced relative movement gives rise to indicator pointer deflection), is related to the proportional load. However, although the proportional forces are continuously varying because the vehicle is in motion over bumps and pot-holes in the road, the average value of these varying proportional forces is substantially equivalent to the proportional load and it is this average value that causes the two elements of the rheostat unit 13 to take up relative positions which are substantially non-varying for a constant proportional load greater than the predetermined value of proportional load. In operation, once the vertical separation between the axle's central portion and the wheel 30 is taken up, the primary relative movement is equivalent to the vertical displacement of the wheel 30 (which can move generally vertically because the pivotted beam 25 is longer than this primary relative movement) and is thus proportional to the vertical displacement of the clamped leg ends of spring 24. In the steady state i.e., the theoretical state when the proportional forces transmitted are constant at their average value), the vertical displacement of the clamped leg ends of spring 24 is equivalent to the vertical displacement of the central portion 23 of spring 24 and is transmitted to the bellows' lower end closure wall 18 which latter thereby serves as the aforesaid intermediate member. The vertical displacement of wall 18 (which in the non-steady state is varying) is mechanically damped by the flexible bellows 17 and this damped vertical displacement is transmitted to the spindle 14 which causes the rheostat element secured to it to move with respect to the other rheostat element secured to the rheostat outer casing 12. Thus an induced relative movement between the two rheostat elements is produced that is equal to the relative movement between the two end closure walls of the bellows (acting as the aforesaid mechanical damping means) and is directly proportional to the primary relative movement.

It will be appreciated that the ball-and-socket connections 11 and 21 are provided to allow for lateral misalignments. If desired the above described embodiment may be modified by inversion and mounting permanently on the central portion of the axle instead of the load-carrying structure so that it will come into operation when the beam 25 is abutted by the underside of the load-carrying structure or a part secured thereto.

In the second embodiment (shown in FIG. 3) the load-carrying structure is supported at the front of the vehicle's front axle(s) through leaf-springs disposed longitudinally of the vehicle at the ends of the or each front axle. The front axle comprises an I-section girder 40 extending transversely across the vehicle. One end portion 41 of an elongate abutment member 42 is held continuously in contact with the girder 40 by a high rate coiled tension spring 43 acting between the abutment member 42 and a bracket 44 secured to the girder. The other end portion 45 of abutment member 42 is pivotally mounted at 35 to one end 46 of a rodlike beam 48 whose other end 47 is welded as at 49 to a central component 50 irrotatably fixed to the vehicle's load-carrying structure.

A flexible bellows 55 has end closure walls 51 and 52 (serving as the aforesaid components of the mechanical damping means) moulded of suitable plastics material rigidly with splined metal spindles 53 and 54 respectively that project a short distance outwardly of the bellows 55 through the end closure walls. The longer spindle 54 is longitudinally slidable within the central bore 56 of a hollow cylindrical drum 57 moulded integrally with the end closure wall 51. The drum 57 extends inwardly of the bellows and an electric resistance element 58 is formed by winding a coil about the outer surface of the drum, which wire coil is engaged by a wiper contact element 59 supported by the end closure wall 52. An air bleed aperture 60 is provided through end closure wall 51, and a small coiled spring 61 surrounds the spindle 54 and acts between end closure wall 52 and the inner end face of drum 57 to urge the end closure walls 51 and 52 towards their maximum separation. Thus the two elements 58 and 59 are wholly enclosed within the bellows 55 and form a rheostat unit whose effective resistance depends on the relative position of the end closure walls 51, 52 and consequently on the relative positions of the elements 58, 59 respectively secured thereto.

The projecting end of short spindle 53 is pivotally mounted at 62 to the beam 48, and the projecting end of long spindle 54 is secured to one end 63 of a high rate blade spring 65 whose other end 64 is rigidly secured to the abutment member 42 adjacent its pivot 35.

In use, an increase in the proportional forces induced in the front leaf-springs cause them to be depressed so that beam 48 moves nearer the front axle and the road. This primary relative movement causes abutment member 42 to pivot about 35 and results in a generally vertical displacement of its opposite end portion 41 and a proportionally smaller generally vertical displacement of the end 64 of blade spring 65. In the steady state the vertical displacement of the blade spring end 64 is equivalent to the vertical displacement of the other end 63 of blade spring 65 and this displacement, through the agency of spindle 54 which serves as the aforesaid intermediate member, causes end closure wall 52 together with wiper contact 59 to alter their positions relative to end closure wall 51 and to resistance element 58. The displacement of wall 52 (which in the non-steady state is varying) is mechanically damped by the flexible bellows 55. Thus an induced relative movement between the two elements 58 and 59 is produced that is equal to the relative movement between the two end closure walls of the flexible bellows 55 and is directly proportional to the primary relative movement itself directly related to the change in proportional forces affecting the front axle. Thus as long as the indicator is read while the vehicle is in motion, an indication may be had of the proportional load on the front axle (which proportional load induces the proportional forces) by connecting the indicator in circuit with the effective resistance of the rheostat winding 58.

It will be appreciated that to further minimize wear of the elements 58 and 59 a lost-motion device may be provided in the mechanism transmitting the primary relative movement to the elements. This may be simply done by providing a vertical spacing between the girder 40 and the end portion 41 of adjustment member 42. Alternatively the coiled winding 58 may be stopped short a predetermined distance from the end face of drum 57 adjacent end closure wall 52. In either event the electrical indicator may be suitably calibrated so that its minimum reading corresponds to the predetermined value of the proportional load.

Furthermore, it will be appreciated that two assemblies such as that shown in FIG. 3 may be provided which are each welded as at 49 to the casing of a vehicle's front-wheel stub axle, in which case readings of the suitably calibrated electrical indicator will correspond to the proportional load on each front wheel, suitable switching arrangements being provided between the electrical indicator and the elements 58 and 59 of the rheostat unit.

In the embodiment of FIGS. 4 to 6, the unit there shown in a cast housing 70 may be mounted rigidly with the load-carrying structure by a plate 71 cast integrally with the housing. An input shaft 72, supported for rotation in bearings 73 in a housing end wall 74, is coupled to a pivot pin secured to one end of a beam (such as the pivot pin 27) secured to the beam 25 of the first embodiment) or to one end of an abutment member (such as the pivot 35 secured to the abutment member 42 of the second embodiment), the opposite end of the beam or abutment member being vertically displaceable in accordance with the primary relative movement (at least when the proportional forces causing this primary relative movement exceed a predetermined value) to thereby provide a corresponding small angular displacement of the pivot pin and the shaft 72.

Within the housing 70 a high rate spiral spring 75 has its inner end 76 secured to the inner end of shaft 72 and its outer end 77 secured to an anchor post 78 (FIG. 6) extending longitudinally from the end 79 of a radially projecting arm 80 that is integral with a generally circular plate 82. Plate 82 is secured by screws 81 to a generally cylindrical drum 84 moulded of a suitable plastics material integrally with a projecting bead 85 and about a central spindle 86. Spindle 86 is rotatable in a fixed longitudinal position by being journaled at one end 83 in a recess in the end of input shaft 72 and at its opposite end 87 in a bearing housing 88 which is staked centrally to a back plate 90 itself secured by long bolts 89 to the housing end wall 74. The bead 85 follows a helical path about the longitudinal axis of drum 84 (and therefore of spindle 86 and of input shaft 72) and has a small helix angle (i.e., a large pitch) preferably of the order of 20° of arc. An electrically resistive wire (not shown) and constituting one element of the rheostat is closely coiled about the surface of drum 84 so as to have a large number of convolutions each having a small region overlying the bead 85 and has one end electrically connected to a conducting pin 91 projecting through and insulatingly mounted in the back plate 90. The other element of the rheostat is constituted by the base 95 of a U-shaped wire frame 92 whose leg ends 93 are coiled about a mounting post 94 (having an encompassing sleeve of insulating material) mounted between the housing end wall 74 and the back plate 90. A coiled torsional spring 96 surrounds the insulated mounting post 94 and has one end hooked around the frame leg end 93 adjacent plate 82 and its other end secured to a conducting pin 97 insulatingly projecting through and secured to the back plate 90. Spring 96 thus serves both to urge base 95 into constant abutment with the resistive wire regions overlying bead 85, and also to electrically connect the base 95 to the conducting pin 97. It will be appreciated that the point or small area of contact between the frame base 95 and the resistive wire region overlying bead 85 adopts a position longitudinally of cylindrical drum 84 that depends on the angular position of cylindrical drum 84. Since the bead 85 has a small helix angle, a comparatively small change in the said angular position causes a substantial change in the said longitudinal position and consequently a substantial change in the effective resistance of the rheostat.

The angular movement of the cylindrical drum 84 is damped by mechanical damping means 100 (FIG. 5) connected by means of an actuating rod 101 to the anchor post 78 on the opposite side of arm 80 to spiral spring 75. The end of actuating rod 101 remote from anchor post 78 is sealing secured to the central region of a flexible diaphragm 102 of rubber or similar material, the perimeter of which is supported by the rim 103 of a cup-shaped support member 104. The outwardly directed flange 106 of a cylindrically walled closure 107 of generally U-shaped cross section is swaged over the diaphragm perimeter and the rim 103 to provide a variable volume chamber or enclosure 105 that is filled with a silicone fluid during assembly. Within chamber 105 a disc 108 is so disposed that a small annular gap exists between the rounded edge of the disc 108 and the cylindrical wall of closure 107, the disc 108 being centrally staked to a pin 109 screwed into the actuating rod 101 axially thereof. An O-ring seal 110 and washer 112 surmount the closure flange 106 externally thereof and a circlip 113 retains all three in a fixed relationship with respect to an annular support step 111 formed as a flange in the cast housing 70.

As shown in FIG. 4, the housing 70 is closed by a wall 114 bolted on to a threaded extension 118 of bearing housing 88 and is provided with two insulated terminals 115, one of which is electrically connected to conducting pin 91 and the other of which is electrically connected to conducting pin 97. O-ring seals 116 and 117 seal the housing 70 against ingress of moisture and dirt.

In use, the small angular displacement of input shaft 72 that is directly related to the primary relative movement is transmitted via the high rate spiral spring 75 to the plate 82 and the drum 84 rotatable therewith. The small movements of the plate 82 (which serves as the aforesaid intermediate member) are damped by the mechanical damping means 100 so that under steady-state conditions the plate 82 and the drum 84 take up an angular position related to the primary relative movement. As explained above, small changes in the angular position of drum 84 result in large changes in the effective resistance of the rheostat so that the electrical indicator connected in an electrical circuit with this effective resistance (through terminals 115) may have a high scale division to unit of proportional load ratio.

It will be appreciated that since the induced relative movement between the rheostat's elements is small, little wear results between these elements. To further minimize wear between the rheostat elements, the high rate spiral spring 75 may be assembled in a stressed condition and restrained from moving out of this condition by the abutment of the end 119 of another radially projecting arm 120 that is integral with plate 82 with stop means (not shown) that are cast integrally with housing 70. Thus the plate 82 will only be moved when the primary relative movement exceeds a predetermined value corresponding to a rotation of input shaft 72 sufficient to unstress spiral spring 75. In this way the indicator need only be calibrated so that its minimum scale marking corresponds with the proportional load inducing the predetermined value of the primary relative movement.

It will be readily apparent that in each of the above-described exemplary embodiments of the invention the high rate spring means (24, 65, 75) connected in series with mechanical damping means (17, 55, 100) constitute mechanical low-pass filtering means.

Conveniently the electrical indicator minimize with each of the above described exemplary embodiments of the invention comprises a moving-coil type of movement, and a pointer cooperating with a scale that is calibrated either in units of weight or in percentage. Preferably the scale is calibrated to read from about 80% to about 110% of the maximum desired safety limit for the proportional load, the lower value corresponding to the predetermined value of the proportional load.

In each of the above-described embodiments the sensor comprises a contact element arranged for wiping engagement of an electrical resistance element to vary the effective resistance of the latter. Such a rheostat type of sensor may be replaced by an inductive pickup sensor which will similarly produce a varying electric signal in accordance with the relative movement between two elements of the sensor. The inductive pickup may comprise a rotary or a linear transformer. A linear transformer may for example comprise an "E-transformer" in which the voltages in two oppositely wound coils each on an extreme limb of the "E" are varied by the movement of a magnetizable bar disposed between the magnetic poles at the limb ends. In a preferred modification of this exemplary linear transformer, a ferrite rod is disposed as an axially movable core within a hollow cylindrical coil former having a central primary winding that is fed with a constant amplitude alternating voltage and having two symmetrically wound secondary windings one each side (i.e., axially) of the primary winding that are electrically connected in opposition. The ferrite core rod is secured to an actuating rod of nonmagnetic material that is rigidly coupled to an intermediate member (such as the wall 18 or the spindle 54 of the respective first or second embodiments) whose displacement is equivalent to the induced relative movement. When the ferrite core is positioned centrally, signals of equal amplitude are fed into both secondary windings and the resultant output signal is zero. Movement of the ferrite core in either axial direction from the central position results in an output signal proportional to position. A phase reversal occurs in this resultant output signal as the ferrite core passes through the central position. Because of this phase reversal the output signal may be demodulated by a phase-sensitive rectifier or alternatively and preferably only the output voltage changes that occur in one predetermined phase need be rectified. Such a linear variable differential transformer can provide a high degree of linearity for resultant output voltage (within a reasonable voltage range) corresponding to an input of the induced relative movement.

It will be appreciated that when each of the above-described arrangements according to this invention is in use, the vehicle suspension oscillates vertically as the vehicle is in motion over a non-smooth terrain, and it is the mean (or average) of these oscillations which is utilized for giving an indication on the electrical indicator of the load related to that vehicle suspension.

What is claimed is:

1. Weighing apparatus to be incorporated in a vehicle that has an axle structure, springs acting on said axle structure, and a load-carrying structure supported by said springs for relative movement with respect to ground, and to be utilized when the vehicle is in motion; said weighing apparatus comprising a sensor and mechanical low-pass filtering means to be associated with said axle structure; wherein said sensor comprises a first element and a second element relatively movable with respect to said first element; wherein means are provided for mounting said first element to one of said structures; wherein said mechanical low-pass filtering means comprises spring means, a member and mechanical damping means comprising a first component and second component relatively movable with respect to said first component; and wherein there is provided means connecting said first element and said first component to one another, means connecting said second element and said second component to one another and to said member, and means connecting said member to said spring means.

2. A vehicle having axles; ground engaging wheels mounted on said axles; springs acting on said axles; a load-carrying structure supported by said springs for relative movement with respect to ground, which relative movement has contributed to it by each axle an effective proportion constituting a primary relative movement; and weighing apparatus to be responsive to variations in load carried by the vehicle and to be utilized when the vehicle is in motion, said weighing apparatus comprising:
   A. an electrical indicator
   B. in association with one of said axles, a sensor having two relatively movable elements whose relative movement is in use induced by a said primary relative movement to produce a correspondingly varying signal; and
   C. mechanical low pass filtering means in association with said sensor to attenuate sudden variations of the primary relative movement which would otherwise produce sudden variations of the induced relative movement, said mechanical low-pass filtering means comprising
      1. an intermediate member;
      2. spring means to transmit at least a fixed proportion of the said primary relative movement to said intermediate member at least when the said primary relative movement exceeds a predetermined value, and
      3. mechanical damping means mounted for actuation by said intermediate member and having
         a. a variable volume chamber comprising a cylinder and a flexible diaphragm forming one end closure of said cylinder,
         b. fluid within said chamber, and
         c. two relatively movable components disposed so that said induced relative movement is substantially proportional to the relative movement between said two components, one of said components being a member having a part thereof disposed within said cylinder for action upon said fluid and another part thereof extending through said flexible diaphragm and connected to said intermediate member.

3. A vehicle having axles; ground engaging wheels mounted on said axles; springs acting on said axles; a load-carrying structure supported by said springs for relative movement with respect to ground, which relative movement has contributed to it by each axle an effective proportion constituting a primary relative movement; and weighing apparatus to be responsive to variations in load carried by the vehicle and to be utilized when the vehicle is in motion, said weighing apparatus comprising:
   A. an electrical indicator,
   B. in association with one of said axles, a sensor having two relatively movable elements whose relative movement is in use induced by a said primary relative movement to produce a correspondingly varying signal; and
   C. mechanical low-pass filtering means in association with said sensor to attenuate sudden variations of the primary relative movement which would otherwise produce sudden variations of the induced relative movement, said mechanical lowpass filtering means comprising
1. an intermediate member,
2. spring means to transmit at least a fixed proportion of the said primary relative movement to said intermediate member at least when the said primary relative movement exceeds a predetermined value, and
3. mechanical damping means mounted for actuation by said intermediate member and having
   a. a variable volume chamber comprising a flexible bellows having rigid end closure walls, one of said walls being provided with a bleed aperture, and
   b. two relatively movable components coupled to said end closure walls and disposed so that said induced relative movement is substantially proportional to the relative movement between said two components.

4. Weighing apparatus for incorporation in a vehicle having an axle structure, ground engaging wheels mounted on said axle structure, springs acting on said axle structure, and a load-carrying structure supported by said springs for relative movement with respect to ground whereby while the vehicle is in motion the two said structures attain an average relative position in accordance with weight imposed on said load-carrying structure, said weighing apparatus comprising:
   a. a spiral spring;
   b. means for coupling a first of said structures to one end of said spiral spring to cause angular displacement of said one end;
   c. electrical transducer means for supplying an electric signal in accordance with said average relative position of the two said structures, and comprising
      1. a generally cylindrical former having an axis and an external rib that follows a helical path of small helix angle about said axis,
      2. means mounting said former to the other end of said spiral spring for angular displacement of said former about its axis in response to displacement of said other end,
      3. an electrical resistance element coiled externally around said former and its rib,
      4. an elongate contact element, and
      5. means mounting said contact element longitudinally of said former for contacting portions of said electrical resistance element above said rib;
   d. damping means having a viscous substance therein; and
   e. means for coupling said damping means between said other end of the spiral spring and the second of said structures to damp out sudden variations in the position of said other end of the spiral spring relative to the second of said structures.

5. A vehicle having axles; ground engaging wheels mounted on said axles; springs acting on said axles; a load-carrying structure supported by said springs for relative movement with respect to ground, which relative movement has contributed to it by each axle an effective proportion constituting a primary relative movement; and weighing apparatus to be responsive to variations in load carried by the vehicle and to be utilized when the vehicle is in motion, said weighing apparatus comprising:
   a. an electrical indicator,
   b. in association with one of said axles, a sensor having two relatively movable elements whose relative movement is in use induced by a said primary relative movement to produce a correspondingly varying signal; and
   c. mechanical low-pass filtering means in association with said sensor to attenuate sudden variations of the primary relative movement which would otherwise produce sudden variations of the induced relative movement,
said sensor being of rheostat type and comprising a generally cylindrical former mounted for angular motion about its longitudinal axis and provided externally with a rib that follows a helical path of small helix angle about said longitudinal axis, an electrical resistance element coiled about said former, and an elongate contact element extending longitudinally of said former for wiping engagement of portions of said electrical resistance element above said rib.

6. The combination of claim 5 wherein said small helix angle is of the order of 20° of arc.

7. A vehicle having an axle structure, ground engaging wheels mounted on said structure, springs acting on said axle structure, a load-carrying structure supported by said springs for relative movement with respect to ground, and weighing apparatus to be responsive to variations in load carried by the vehicle and to be utilized when the vehicle is in motion, said weighing apparatus comprising spring means, first means operative to couple one of two ends of the spring means to a first of said structures, electrical transducer means for responding to relative movement between the other of said two ends of the spring means and the second of said structures to supply an electric signal to said indicator in dependence upon the position of said other end of the spring means relative to said second structure, damping means, second means operative to couple the damping means between said other end of the spring means and the second of said structures to damp out sudden variations in said relative position, and electrical indicator means responsive to said electric signal to provide a load indication dependent thereon.

8. The vehicle of claim 7 wherein said spring means is prestressed so as to only transmit a proportion of the relative movement between said two structures to said other end of the spring means when the distance between said structures is below a predetermined value.

9. The vehicle of claim 7, wherein the electrical transducer means is of an electrically inductive character and comprises a linear differential transformer.

10. The vehicle of claim 7, wherein said electrical indicator means comprises a moving-coil type instrument.

11. The vehicle of claim 7 wherein said first means comprises an abutment member secured to one of said structures for abutment by the other of said structures, and wherein said spring means acts on said abutment member.

12. The vehicle of claim 11, comprising restraining means to restrain said abutment member from abutment by said structures when the distance between said structures exceeds a predetermined value.

13. The vehicle of claim 7, wherein the electrical transducer means is of rheostat type and comprises a generally cylindrical former having an electrical resistance element coiled thereon and a contact element disposed for wiping engagement of said electrical resistance element.

14. The vehicle of claim 13, wherein said generally cylindrical former has a longitudinal axis, is mounted for angular motion about said axis, and is provided externally with a rib that follows a helical path of small helix angle about said axis; and wherein said contact element is elongate, extends longitudinally of said former, and contacts portions of said electrical resistance element above said rib.

15. The vehicle of claim 14 wherein said small helix angle is of the order of 20° of arc.

16. The vehicle of claim 7, wherein said mechanical damping means comprises a variable volume chamber.

17. The vehicle of claim 16 wherein said variable volume chamber comprises a cylinder and a flexible diaphragm forming one end closure of said cylinder, fluid being provided within said cylinder; said damping means further comprising a member disposed within said cylinder for action upon said fluid, and an external actuator extending through said flexible diaphragm and connected to said other end of the spring means.

18. The vehicle of claim 16 wherein said variable volume chamber comprises a flexible bellows having rigid end closure walls, one of said walls being provided with a bleed aperture.

* * * * *